United States Patent [19]

Rock et al.

[11] Patent Number: 5,280,085

[45] Date of Patent: Jan. 18, 1994

[54] POLYPHENYLENE ETHER/SILOXANE POLYETHERIMIDE COPOLYMER

[75] Inventors: John A. Rock, Becket; Norman E. Durfee, Jr., Lansboro, both of Mass.; L. Joseph Male, Old Chatham, N.Y.

[73] Assignee: General Electric Company, Pittsfield, Mass.

[21] Appl. No.: 798,840

[22] Filed: Nov. 25, 1991

Related U.S. Application Data

[63] Continuation of Ser. No. 563,750, Aug. 3, 1990, abandoned, which is a continuation of Ser. No. 304,907, Feb. 1, 1989, abandoned, which is a continuation of Ser. No. 46,192, May 5, 1987, abandoned.

[51] Int. Cl.⁵ .................... C08L 71/12; C08L 83/08
[52] U.S. Cl. ........................... 525/393; 525/397
[58] Field of Search ............... 525/393, 397, 474; 528/26, 38

[56]                  References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,306,874 | 2/1967 | Hay | 260/47 |
| 3,306,875 | 2/1967 | Hay | 260/47 |
| 3,733,299 | 5/1973 | Cooper et al. | 260/47 |
| 3,972,902 | 8/1976 | Heath | 260/346.3 |
| 4,028,341 | 6/1977 | Hay | 260/47 |
| 4,431,779 | 2/1984 | White et al. | 525/397 |
| 4,586,997 | 5/1986 | Lee | 528/26 |
| 4,598,140 | 7/1986 | Haitko | 528/215 |
| 4,609,569 | 2/1986 | Edelman et al. | 528/26 |
| 4,652,598 | 3/1987 | Edelman | 524/99 |
| 4,690,997 | 9/1987 | Cella et al. | 528/26 |

FOREIGN PATENT DOCUMENTS

| | | |
|---|---|---|
| 91118 | 10/1983 | European Pat. Off. . |
| 2116836 | 10/1971 | Fed. Rep. of Germany . |
| 257010 | 11/1969 | U.S.S.R. . |
| 1353501 | 5/1974 | United Kingdom . |
| 8602593 | 5/1986 | World Int. Prop. O. . |

OTHER PUBLICATIONS

Flame Retardancy of Polymeric Materials, vol. 2, W. C. Kuryla and A. J. Papa (Eds.), Marcel Dekker, New York 1973, p. 157.

Koton, M. M. and Florinski, F. S. *Zh. Org. Khin.*, 4 (5), 744 (1968).

*Primary Examiner*—Ralph H. Dean

[57]                    ABSTRACT

Polymer blends contain a polyphenylene ether and a siloxane-polyetherimide copolymer. These blends exhibit good ductility, good injection moldability, very low flammability and high impact strengths.

17 Claims, No Drawings

POLYPHENYLENE ETHER/SILOXANE POLYETHERIMIDE COPOLYMER

This is a continuation of application Ser. No. 07/563,750, filed Aug. 3, 1990, now abandoned, which, is a continuation of application Ser. No. 304,907, filed Feb. 1, 1989, now abandoned, which is a continuation of Ser. No. 046,192, filed May 5, 1987, now abandoned.

BACKGROUND OF THE INVENTION

This invention relates to polymer blends which are characterized by good ductility, good injection moldability, very low flammability and high impact strengths.

Polyphenylene ethers (also known as polyphenylene oxides) are engineering thermoplastics characterized by high inherent heat capacities, low moisture absorption rates and good hydrolytic stabilities, excellent dimensional stabilities and electrical properties. An object of the present invention is to provide polyphenylene ether resin blends in which the flame resistance, the processability and certain of the physical properties of the polyphenylene ether are improved.

Polyphenylene ether resins have been blended and modified with a variety of ingredients, including other engineering plastics. For example, U.S. Pat. No. 4,431,779 discloses a polymer blend which contains a polyetherimide and a polyphenylene ether. The blend is described as exhibiting good impact strength and other mechanical properties.

A continuing need exists for polymers and polymer blends which exhibit low flammabilities, which have advantageous physical properties and which are processable by conventional techniques.

SUMMARY OF THE INVENTION

In accordance with the present invention, polymer blend compositions contain a polyphenylene ether and a property-improving amount of siloxane polyetherimide copolymer.

The polymer blends of this invention have been found to possess excellent physical properties. The blends exhibit good ductility, good injection moldability and very low flammability.

DETAILED DESCRIPTION OF THE INVENTION

The polyphenylene ether resins employed in the blends of this invention are well-known engineering thermoplastics. They contain repeating structural units of the formula:

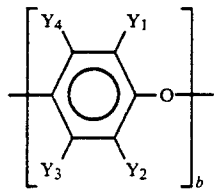

where the oxygen ether atom of one structural unit is connected to the benzene nucleus of the next adjoining unit, b is a positive integer and is at least 50, generally at least 100, and $Y_1$, $Y_2$, $Y_3$ and $Y_4$, which may be the same or different, are monovalent substitutents selected from the group consisting of hydrogen, halogen, hydrocarbon radicals, halohydrocarbon radicals having at least two carbon atoms between the halogen atom and the benzene nucleus, hydrocarboxy radicals and halohydrocarboxy radicals having at least two carbon atoms between the halogen atoms and the benzene nucleus. Suitable hydrocarbon radicals include alkyl of one to ten carbon atoms and aryl of six to twenty carbons atoms. Preferred polyphenylene ethers for the purposes of the present invention include those where $Y_1$ and $Y_2$ are selected from alkyl of one to four carbon atoms and phenyl and $Y_3$ and $Y_4$ are hydrogen. Particularly preferred polyphenylene ethers for the purposes of the present invention are poly(2,6-dimethyl-1,4-phenylene)-ether, i.e., $Y_1$ and $Y_2$ are methyl, poly(2,6-diphenyl-1, 4 phenylene)ether, i.e., $Y_1$ and $Y_2$ are phenyl, and poly(2-methyl-6-phenyl-1,4-phenylene)ether, i.e., $Y_1$ is methyl and $Y_2$ is phenyl. Other suitable polyphenylene ethers include poly(2-benzyl-6-methyl-4 phenylene)ether and poly(2,6-dibenzyl-1,4 phenylene)ether.

In addition, copolymers such as those comprised of 2,6-dimethylphenylene units and 2,3,6-trimethylphenylene units may be employed.

The polyphenylene ethers used in these blends typically have intrinsic viscosities (I.V.) greater than 0.1 dl/g, as measured in chloroform at 25° C. Preferred polyphenylene ether resins have I.V.'s ranging from about 0.4 to about 0.6 dl/g.

Suitable methods for preparing polyphenylene ethers are disclosed in Hay U.S. Pat. Nos. 3,306,874 and 3,306,875 and Stamatoff U.S. Pat. Nos. 3,257,357 and 3,257,358, incorporated herein by reference in their entireties. One method for preparing polyphenylene ethers comprises oxidizing a substituted phenol of the formula:

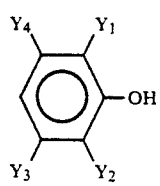

where $Y_1$, $Y_2$, $Y_3$ and $Y_4$ have the meanings set forth above. Oxidation of the phenol can be accomplished by contacting the phenol with an oxygen-containing gas in the presence of a catalyst, such as a cuprous salt and a tertiary amine.

The polyetherimide siloxane copolymer employed in the blends of this invention contain repeating groups of the formula:

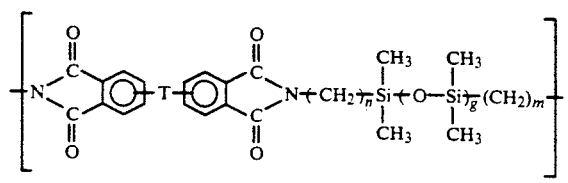

and

-continued

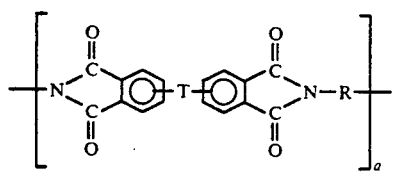

wherein "a" is an integer greater than 1, e.g., from 10 to 10,000 or more; T is —O— or a group of the formula

—O—Z—O— wherein the divalent bonds of the —O— or the —O—Z—O— group are in the 3,3'; 3,4'; 4,3', or the 4,4' positions; Z is a member of the class consisting of (A):

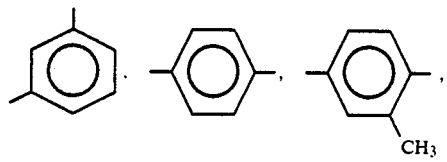

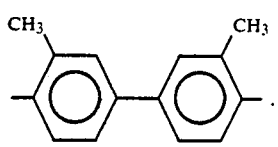

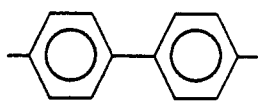

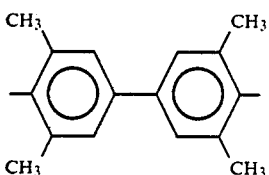

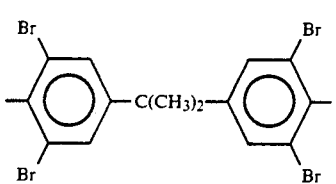

or (B) divalent organic radicals of the general formula

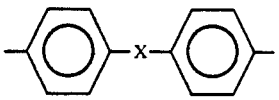

where X is a member selected from the group consisting of divalent radicals of the formulas

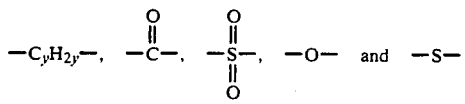

where y is an integer from 1 to about 5; n and m independently are integers from 1 to about 10; g is an integer from 1 to about 40; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

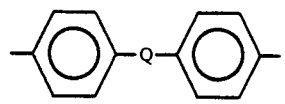

where Q is a member selected from the group consisting of

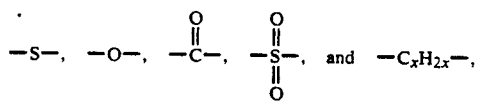

and x is an integer from 1 to about 5.

In one embodiment, the polyetherimide-siloxane copolymer may be a copolymer which, in addition to the etherimide units described above, further contains polyimide repeating units of the formula

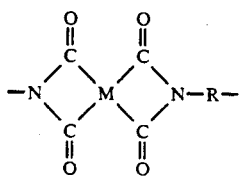

wherein R is as previously defined and M is selected from the group consisting of

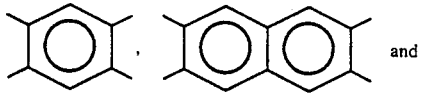

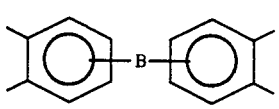 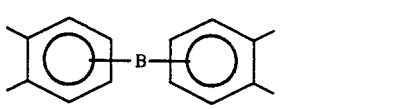

where B is —S— or

The polyetherimide-siloxane copolymers can be prepared by methods well known to those skilled in the art, including the reaction of an aromatic bis(ether anhydride) of the formula

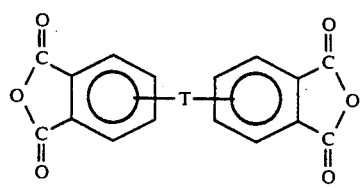

(1)

with two or more organic diamines of the formulas

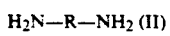

and

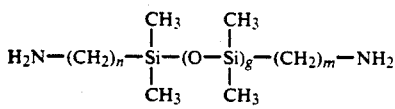

where n, m, g, T and R are defined as described above.

Bis(ether anhydride)s of formula I include, for example, 1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride; and
1,4-bis(3,4-dicarboxyphenoxy)benzene dianhydride;
4,4'-bis(phthalic anhydride)ether.

A preferred class of aromatic bis(ether anhydride)s included by formula I includes compounds of formula IV, V and VI, which follow:

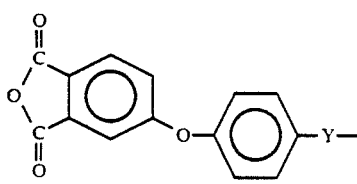

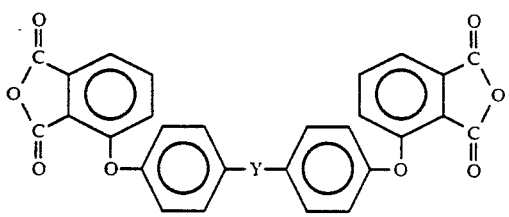

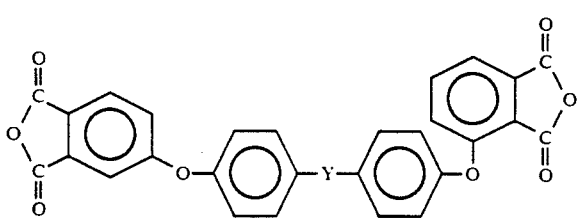

and mixtures thereof, where Y is selected from the group consisting of —O—, —S—,

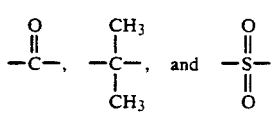

Aromatic bis(ether anhydride)s of formula IV include, for example:

2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenyl sulfone dianhydride; and mixtures thereof.

Aromatic bis(ether anhydride)s of formula V include, for example:

2,2-bis([4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-diacarboxyphenoxy)benzophenone dianhydride;
4,4'-bis(2,3-dicarboxyphenoxy)diphenyl sulfone dianhydride; and mixtures thereof.

The aromatic bis(ether anhydride)s of formula VI may be, for example, 4-(2,3-dicarboxyphenoxy)-4'-(3,4-dicarboxyphenoxy) diphenyl-2,2-propane dianhydride.
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy) benzophenone dianhydride;
4-(2,3-dicarboxyphenoxy)-4'-(3,4-dicarboxyphenoxy) diphenyl sulfone dianhydride, and mixtures thereof.

Some of the aromatic bis(ether anhydride)s of formula (I) are disclosed in U.S. patent 3,972,902 (Darrell Heath and Joseph Wirth). As described therein, the bis(ether anhydride)s can be prepared by the hydrolysis, followed by dehydration, of the reaction product of a nitrosubstituted phenyl dinitrile with a metal salt of dihydric phenol compound in the presence of a dipolar, aprotic solvent.

Additional aromatic bis(ether anhydride)s also included by formula (I) above are shown by Koton, M. M., Florinski, F. S., Bessonov, M. I. and Rudakov, A. P. (Institute of Heteroorganic Compounds, Academy of Sciences, U.S.S.R), U.S.S.R. patent 257,010, Nov. 11, 1969, Appl. May 3, 1967, and by M. M. Koton, F. S. Florinski, Zh. Org. Khin. 4(5), 774 (1968).

The organic diamines of formula (II) include, for example:
m-phenylenediamine,
p-phenylenediamine,
4,4'-diaminodiphenylpropane,
4,4'-diaminodiphenylmethane (commonly named 4,4'-methylenedianiline),
4,4'-diaminodiphenyl sulfide,
4,4'-diaminodiphenyl sulfone,
4,4'-diaminodiphenyl ether (commonly named 4,4'-oxydianiline),
1,5-diaminonaphthalene,
3,3-dimethylbenzidine,
3,3-dimethoxybenzidine,
2,4-bis(beta-amino-t-butyl)toluene,
bis(p-beta-amino-t-butylphenyl)ether,
bis(p-beta-methyl-o-aminophenyl)benzene,
1,3-diamino-4-isopropylbenzene,
1,2-bis(3-aminopropoxy)ethane, benzidine,
m-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine, octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine, and mixtures of such diamines.

The two organic diamines, including a diamine of formula II and the amine-terminated organosiloxane of formula III, may be physically mixed prior to reaction with the bis(ether anhydride)(s), thus forming a substantially random copolymer. Alternatively, block or alternating copolymers may be formed by forming prepolymers or sequential addition of reactants, as is well-known in the polymer arts.

Preferred amine-terminated organosiloxanes are those of the formula III, in which n and m independently range from 1 to about 5 and g ranges from about 5 to about 25. Particularly preferred amine-terminated organosiloxanes are those in which n and m are each 3, and which have a molecular weight distribution such that g has an average value ranging from about 9 to about 20.

The diamine component of the siloxane polyetherimide copolymers generally contains from about 20 to 50 mole % of the amine-terminated organosiloxane of formula III and from about 50 to 80 mole % of the organic diamine of formula II. In preferred copolymers, the diamine component contains from about 25 to about 40 mole %, most preferably about 35 mole % of the amine-terminated organosiloxane.

Blending a siloxane polyetherimide copolymer with a polyphenylene ether has been found to enhance various important physical properties of the polyphenylene ether. In particular, the ductility of the blend is considerably better than that of the unmodified polyphenylene ether. In addition, the blend is easily fabricated into useful parts, for example, by extrusion forming and injection molding. The heat distortion temperatures (HDT) of the blends of this invention are unexpectedly high, especially in view of the rather low HDT's of unblended siloxane polyetherimide copolymers. A further unexpected advantage of the polyphenylene ether/siloxane polyetherimide copolymer blends of this invention is their very low flammability. The low flammability of these blends is important for many applications in the transportation and building industries.

In addition to the polymeric ingredients, the blends may contain other materials, such as fillers, additives, reinforcing agents, pigments and the like. Fiber fillers, such as calcium sulfate fibers, may advantageously be added to the resin to improve dimensional stability. Such filled resins exhibit good ductility retention.

Various plasticizers also may advantageously be added to the present blends to improve processability. Examples of such plasticizers include triaryl phosphates (available commercially as Kronitex 50) and sodium salts of lauryl sulfate (available commercially as Hostastat HS-1) and the like.

The siloxane polyetherimide copolymer is employed in the present blends in a property-improving concentration. In general, such concentration is an amount sufficient to improve the flammability properties, the ductility, impact strength or processability of the unmodified polyphenylene ether. Such concentrations generally range, for example, from about 1% to about 40% by wt. of the blends, preferably, from about 3% to about 25% by wt. of the blends.

Various blends have been prepared in accordance with this invention and tested for physical properties and flame resistance. The results of these tests are shown in the following examples, which are provided for illustration only and are not intended to be limiting.

EXAMPLES 1-11

Polymer blends described in the table below were prepared by a conventional melt-blending procedure using a laboratory extruder. The blends were extruded into small diameter strands, which were chopped into pellets for further molding into test parts.

The polyphenylene ether resin employed in these experiments was poly(2,6-diphenyl-1,4-phenylene)ether. The siloxane polyetherimide copolymer is the reaction product of a mixture of m-phenylenediamine and an amine-terminated organosiloxane, with 2,2-bis[4-(3,4-dicarboxyphenoxy)phenyl]propane dianhydride ("BPA-DA"). The siloxane polyetherimide copolymer designated in Table I as type A is a random copolymer prepared from BPA-DA and a mixture of 60 mole % m-phenylenediamine and 40 mole % of an amine-terminated organosiloxane of formula III wherein n and m are 3 and g has an average value of 9. The siloxane polyetherimide copolymer designated type B is a block copolymer prepared from BPA-DA and a mixture of 70 mole % m-phenylenediamine and 30 mole % of an amine-terminated organosiloxane of formula III wherein n and m are 3 and g has an average value of 15. The siloxane polyetherimide copolymer of designated type C is the same as type B, except that the diamine component contains 35 mole % of the amine-terminated organosiloxane. The siloxane polyetherimide copolymer designated type D is the same as type C except that the diamine component contains 41 mole % of the amine-terminated organosiloxane and the average value of g is 10. The siloxane polyetherimide copolymer designated type E is the same as type C, except g has an average value of 10.

TABLE 1

| Example No. | Poly phenylene ether (wt %) | Siloxane polyetherimide copolymer (wt %) | Siloxane Polyetherimide copolymer type | Tensile Properties[1,7] Strength Yield (psi) | Tensile Properties[1,7] Elongation Ultimate (%) | Flexural Properties[2] Modulus (psi) | Flexural Properties[2] Strength (psi) | Notched[3] Izod (ft-lb/in) | Heat Deflection Temperature (°C.) | Flammability[5] UL 94 @ 0.062 in. | Oxygen[6] Index (%) |
|---|---|---|---|---|---|---|---|---|---|---|---|
| 1 | 100 | 0 | — | 10,400 | 16 | 373,700 | 15,900 | 1.1 | 186.1 | V-1 | 30 |
| 2 | 97 | 3 | E | 10,500 | 65 | 362,800 | 16,500 | 1.1 | 182 | V-0 | — |
| 3 | 95 | 5 | A | 10,600 | 36 | 363,700 | 15,200 | 1.6 | 186 | V-0 | 44 |
| 4 | 92.5 | 7.5 | A | 10,400 | 32 | 353,500 | 14,500 | 2.0 | 185 | V-0 | — |
| 5 | 90 | 10 | A | 9,200 | 4.5 | 347,200 | 14,600 | 2.3 | 184 | V-0 | 46 |
| 6 | 75 | 25 | A | 7,800 | 3.7 | 328,100 | 14,000 | .7 | 167 | V-0 | 46 |
| 7 | 75 | 25 | B | 7,200 | 3.2 | 325,000 | 10,600 | .7 | 174 | V-0 | — |
| 8 | 75 | 25 | C | 6,700 | 3.4 | 292,300 | 12,800 | .8 | 169 | V-1 | — |
| 9 | 75 | 25 | D | 6,200 | 3.2 | 288,800 | 12,100 | .9 | 172 | V-1 | — |
| 10 | 60 | 40 | C | 4,800 | 2.7 | 249,500 | 6,400 | .4 | 116 | V-2 | — |
| 11[8] | 85 | 5 | E | 10,000 | 58 | 444,900 | 16,300 | 1.3 | 183 | V-0 | — |

[1]Determined by ASTM procedure D638.
[2]Determined by ASTM procedure D790.
[3]Determined by ASTM procedure D256.
[4]Determined by ASTM procedure D648.
[5]Determined by the procedure described in Underwriters Laboratories Bulletin No. 94.
[6]Determined by ASTM procedure D2863.
[7]Tensile values for Examples 1, 3, and 4 were obtained using a crosshead speed of 2 in./min., and all other tensile values were obtained using a crosshead speed of 0.2 in./min.
[8]In Example 11, the blend additionally contained 10% calcium sulfate fibers, known commercially as Franklin ® fibers, obtained from U.S. Gypsum Corp.

We claim:

1. A polymer blend which comprises from about 60% to about 99% by weight of a polyphenylene ether and from about 1% to about 40% by weight of a siloxane polyetherimide copolymer which contains from about 20 to about 50 mol % of repeating units of the formula:

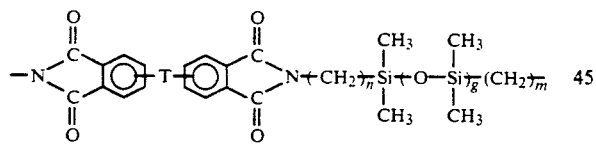

and from about 50 to about 80 mole % of repeating units of the formula:

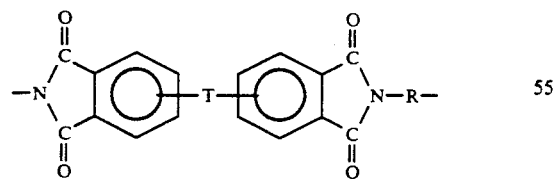

wherein n and m independently are integers from 1 to about 10; g is an integer from about 5 to about 25; T is —O— or a group of the formula

—O—Z—O— wherein the divalent bonds of the —O— or the —O—Z—O— group are in the 3,3', 3,4', 4,3' or 4,4' positions; Z is a member of the group consisting of (A)

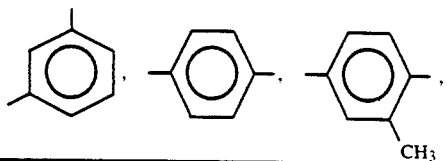

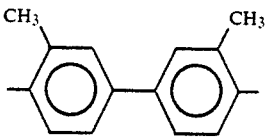

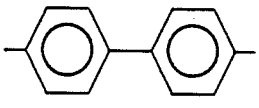

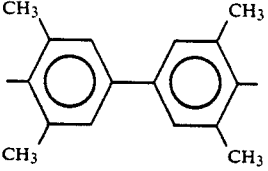

and

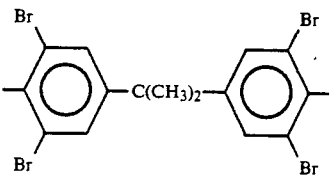

and (B) divalent organic radicals of the general formula

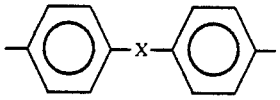

where X is a member selected from the group consisting of divalent radicals of the formulas

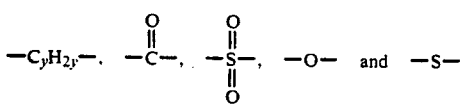

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

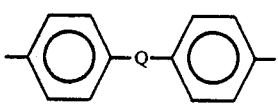

where Q is a member selected from the group consisting of

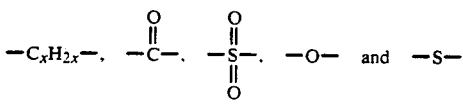

and x is an integer from 1 to about 5.

2. The polymer blend of claim 1, wherein the siloxane polyetherimide copolymer further contains repeating units of the formula

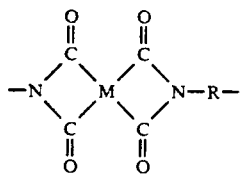

wherein M is selected from the group consisting of

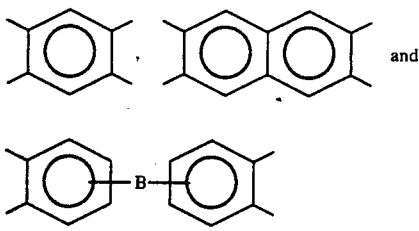

where B is —S— or

and R is as defined in claim 1.

3. The polymer blend of claim 2, wherein n and m are integers from 1 to about 5.

4. The polymer blend of claim 3, wherein g has an average value from 9 to about 20.

5. The polymer blend of claim 1, 2 or 3 wherein the siloxane polyetherimide copolymer is a substantially random copolymer.

6. The polymer blend of claim 1, 2 or 3, wherein the siloxane polyetherimide copolymer is a block copolymer.

7. The polymer blend of claim 1, 2 or 3, wherein the siloxane polyetherimide copolymer is an alternating copolymer.

8. The polymer blend of claim 1, wherein the polyphenylene ether comprises repeating units of the formula:

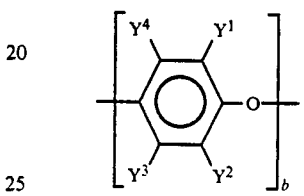

wherein the oxygen ether atom of one structural unit is connected to the benzene nucleus of the next adjoining unit, b is a positive integer and is at least 50 and $Y_1$, $Y_2$, $Y_3$ and $Y_4$, which may be the same or different, are monovalent substitutents selected from the group consisting of hydrogen, halogen, hydrocarbon radicals, halohydrocarboxy radicals and halohydrocarboxy radicals having at least two carbon atoms between the halogen atom and the benzene nucleus.

9. The polymer blend of claim 8, wherein $Y_1$ is methyl, $Y_2$ phenyl and $Y_3$ and $Y_4$ are hydrogen.

10. The polymer blend of claim 8, wherein $Y_1$ and $Y_2$ are methyl and $Y_3$ and $Y_4$ are hydrogen.

11. The polymer blend of claim 8, wherein $Y_1$ and $Y_2$ are phenyl and $Y_3$ and $Y_4$ are hydrogen.

12. The polymer blend of claim 8, wherein the polyphenylene ether is a copolymer which contains repeating units of the formula shown in claim 8, in which $Y_1$ and $Y_2$ are methyl and $Y_3$ and $Y_4$ are hydrogen and repeating units of the formula shown in claim 8, in which $Y_1$, $Y_2$ and $Y_4$ are methyl and $Y_3$ is hydrogen.

13. The polymer blend of claim 8, wherein the polyphenylene ether has an intrinsic viscosity, measured in chloroform at 25° C., of at least 0.1 dl/g.

14. The polymer blend of claim 13, wherein the intrinsic viscosity ranges from about 0.4 dl/g to about 0.6 dl/g.

15. The polymer blend of claim 1, wherein the organosiloxane-containing repeating unit constitutes from about 25 to about 40 mole % of the siloxane polyetherimide copolymer.

16. The polymer blend of claim 1, which contains from about 3% to about 25% by wt. of the siloxane polyetherimide copolymer.

17. The polymer blend of claim 1, which further contains fillers, pigments, reinforcing agents, plasticizers or mixtures thereof.

* * * * *